United States Patent

McClelland

(10) Patent No.: US 8,852,355 B1
(45) Date of Patent: Oct. 7, 2014

(54) ELEVATED POTABLE WATER TANK AND TOWER CLEANING SYSTEM

(71) Applicant: Joseph James McClelland, Mount Vernon, IL (US)

(72) Inventor: Joseph James McClelland, Mount Vernon, IL (US)

( * ) Notice: Subject to any disclaimer, the term of this patent is extended or adjusted under 35 U.S.C. 154(b) by 0 days.

(21) Appl. No.: 13/729,928

(22) Filed: Dec. 28, 2012

(51) Int. Cl.
*B08B 9/00* (2006.01)
*B08B 3/02* (2006.01)

(52) U.S. Cl.
CPC ........................................ *B08B 3/02* (2013.01)
USPC ..... 134/166 R; 134/21; 134/22.1; 134/22.18; 134/10; 134/167 R; 15/1.7; 15/302; 15/345

(58) Field of Classification Search
CPC .... B08B 9/0933; B08B 9/0936; B08B 9/093; E04H 4/1654; B01D 21/245
USPC .......... 134/10, 22.1, 166 R, 169 R, 21, 104.4; 210/523, 715; 122/383; 137/337
See application file for complete search history.

(56) References Cited

U.S. PATENT DOCUMENTS

| | | | |
|---|---|---|---|
| 1,127,354 A | 2/1915 | Eckliff | |
| 1,616,372 A * | 2/1927 | Janson | 122/383 |
| 2,045,752 A | 6/1936 | Butterworth | |
| 4,024,881 A * | 5/1977 | Weiland et al. | 134/104.4 |
| 4,364,776 A | 12/1982 | McBride et al. | |
| 4,913,819 A | 4/1990 | Patterson | |
| 5,582,652 A | 12/1996 | Robertson et al. | |
| 5,613,510 A | 3/1997 | Proctor | |
| 5,671,771 A | 9/1997 | Brandel | |
| 6,125,865 A * | 10/2000 | Bacon Cochrane et al. | 134/169 R |
| 6,217,207 B1 | 4/2001 | Streich et al. | |
| 7,087,175 B2 | 8/2006 | Mackrle et al. | |
| 7,210,488 B2 | 5/2007 | Desormeaux | |
| 7,690,066 B2 * | 4/2010 | Stoltz et al. | 15/1.7 |
| 7,959,741 B2 | 6/2011 | Green | |
| 2013/0026306 A1 * | 1/2013 | Mominee et al. | 248/62 |

* cited by examiner

*Primary Examiner* — Michael Barr
*Assistant Examiner* — Thomas Bucci
(74) *Attorney, Agent, or Firm* — Grace J. Fishel

(57) ABSTRACT

A system for vacuuming out sediment when installed on the inside of a gravity feed, elevated potable water tank or tower holding water at a pressure head of the kind having a riser serving as a water inlet and outlet. The system having a manifold installed along the bottom wall of the tank or tower connected to a plurality of downwardly directed nozzles. The manifold is connected to a drain pipe passing down through the riser and is supported so that the nozzles are positioned above the bottom wall in the vicinity of the sediment. When water is allowed to flow through the drain pipe, the pressure head causes sediment which may otherwise be a health risk and promote electrolytic corrosion to be vacuumed out by the nozzles.

10 Claims, 3 Drawing Sheets

ELEVATED POTABLE WATER TANK AND TOWER CLEANING SYSTEM

BACKGROUND OF THE INVENTION

1. Field of the Invention

The present invention relates to a system for vacuuming out sediment from a potable gravity water tank or tower without any disruption in service.

2. Brief Description of the Prior Art

Most water storage tanks and towers are not designed to be cleaned and have no "drain pipe" or "washout pipe." But the fact is that all water tanks and towers accumulate sediment in time which becomes a safe habitat for bacteria, protozoa and viruses. In time, the layer of sediment can grow from inches to several feet thick. This is health problem because water flows in and out of the tank through the same pipe in the bottom hence we drink from the bottom of the tank. In addition to being a health risk, sedimentation promotes electrolytic corrosion which naturally occurs in metal tanks over time due to electrical imbalances between the water and the conductive tank material. While water tanks are painted to resist corrosion, sedimentation promotes the passage of electrical current between the negatively charged metal and positively charged water, which can eat through the paint. While corrosion poses no threat to water quality, it does pose a threat to a tower's structural integrity at the bottom of the water tank which is subjected to the greatest pressure and where corrosion can least be afforded.

While some states require water storage tanks and towers to be inspected, only Florida requires them to be cleaned. Inspection and cleaning are not the same. Inspection may consist of putting an underwater camera inside the tank to check for structural soundness of the roof and walls and for the condition of the paint without paying attention to the sediment on the floor. Traditionally cleaning has required draining the tank or tower and sending a crew inside with buckets and shovels. Shovels are hard on the painted surface and even the most dedicated crew cannot get cannot get all of the sediment off the floor.

Another way to clean out a tank or tower is with a pressure washer which also requires draining the tank. Workers are sent into the tank where they flush the sediment down the water inlet pipe as there is no where else for it to go. Hence the sediment that is flushed down the pipe is pumped right back up into the tank when the tank or tower is put back into service. Both the bucket and shovel method and pressure washing require putting the tank or tower out of service for some period of time.

Presently, the only way to clean out the sediment without disrupting service is by sending a diver into the tank. To keep the water potable, the diver must be washed down with a chlorine solution. The diver can then enter the tank or tower and vacuum loose sediment from the floor. This leaves the tank much cleaner than pressure washing or the tradition bucket and shovel method but it is dangerous, requires equipment that is only used in potable water and expensive. It is also not legal in some states.

Municipal budgets are frequently stretched in poorer or less populated communities and since tank and tower cleaning is not federally or state mandated, not done. Elected officials may vote to clean or repaint the exterior of a water tank or tower without considering the inside condition, as out of sight is out of mind, but serious illnesses may occur when an event scours disease laden sediment into the distribution system (e.g., fire flow, poor operation, power outages, etc.) and sediment presents a health hazard to susceptible individuals at all times and a risk to the public in general. In addition, sediment also promotes electrolytic corrosion in the bottom of the tank which may put the tower at risk of rusting through.

BRIEF SUMMARY OF THE INVENTION

In view of the above, it is an object of the present invention to provide a system for vacuuming out sediment from an elevated potable water tank or tower without any disruption in service. It is another object to provide a cleaning system that does not require sending a man up the tower or into the tower to initiate cleaning and which is within the budget of most communities to install and maintain. It is also an object to provide a cleaning system that is effective at removing sediment before it has time to build into a dangerous layer which is both a health risk and a corrosion promoter. Other objects and features of the invention will be in part apparent and in part pointed out hereinafter.

The present invention is for use in an elevated potable water tank or tower wherein an accumulation of sediment occurs along a bottom wall surface. The water tank or tower holds water at a pressure head and is of the kind having an inlet riser pipe which serves as a water inlet and outlet. The system for vacuuming out the sediment includes a manifold installed along the bottom wall of the tank or tower which is connected to a plurality of downwardly directed nozzles. The manifold is supported above the bottom wall on struts such that the nozzles are positioned above the bottom wall in the vicinity of the sediment. A drain pipe is connected to the manifold and extends through the riser pipe with a valve for controlling flow of water through the drain pipe. The nozzles and manifold are in fluid communication with the drain pipe so that when the valve is open the pressure head in the tank or tower causes the nozzles to vacuum out the sediment as water flows through the drain pipe.

The invention summarized above comprises the constructions hereinafter described, the scope of the invention being indicated by the subjoined claims.

BRIEF DESCRIPTION OF THE SEVERAL VIEWS OF THE DRAWING

In the accompanying drawings, in which several of various possible embodiments of the invention are illustrated, corresponding reference characters refer to corresponding parts throughout the several views of the drawings in which.

DETAILED DESCRIPTION OF THE INVENTION

Figure 1:
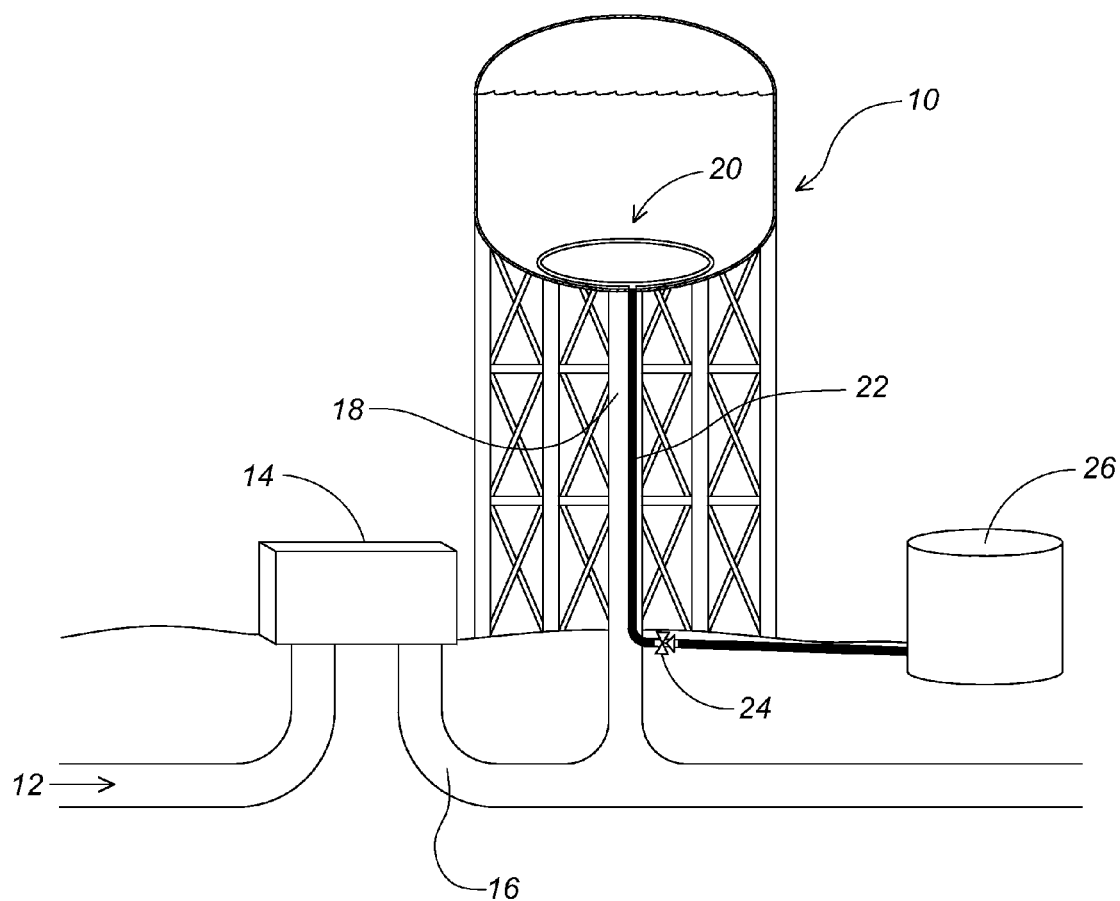
FIG. 1 is a diagrammatic elevational view partly broken away of an elevated water tower with a manifold for vacuuming out sediment.

Referring to the drawings more particularly by reference character a multi-legged elevated potable water tower 10 is shown in FIG. 1. As shown, water from a well or water treatment plant 12 is pressurized by pump 14 which sends the water into the water system's primary feeder line 16. Water tower 10 is connected to primary feeder line 16 as shown in the diagram and water flows up a riser 18 into the tank through an inlet in the bottom wall of the tank. After the tank is pumped full, the pump and the well may be shut down allowing the pump and the well to rest and recover. Filled water tank 10 stores water and maintains a pressure head, typically between 50 and 120 PSI, in the water system and must be tall enough to supply that level of pressure into feeder line 16 which is connected to the users of the system. In hilly regions, a water tower may be a tank located on a hill and for that reason the terms water tower and water tank are used interchangeably in the following description. Depending on the community's demand for water, the cycle of filling and draining the tank through the riser pipe may repeat several times a day which is a reason that a tank will accumulate sediment as quickly as it does.

The present system for vacuuming out sediment may be used in gravity tanks such as multi-legged towers, pedispheres, fluted column water towers, standpipe water towers, etc. As shown in FIG. 1, a manifold 20 which is more particularly described below is provided in the bottom of water tower 10 for vacuuming out sediment. Manifold 20 is attached to a drain pipe 22 which is installed inside riser pipe 18. Drain pipe 22 exits riser pipe 18 under control of a valve 24. While shown at the base, it will be understood that valve 24 may be a no-freeze valve and may be located anywhere in drain pipe 22. With continuing reference to FIG. 1, water laden with sediment exiting drain pipe 22 may be fed into a settling tank 26 if required by federal, state or local regulations. The sediment in settling tank 26 may be cleaned out from time to time and the sediment hauled to a disposal site.

Figure 2:
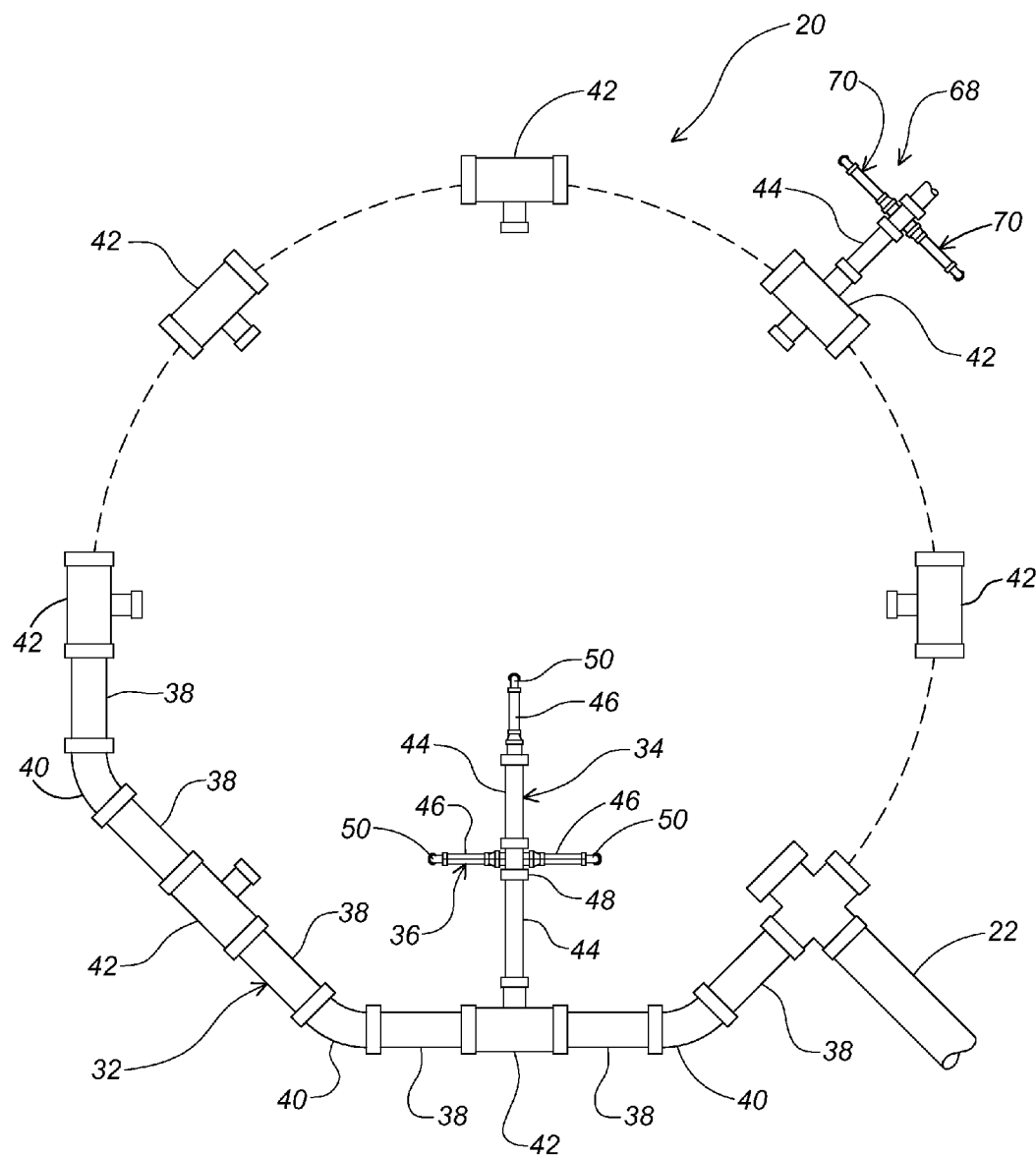
FIG. 2 is a plan view of the manifold.
Figure 3:
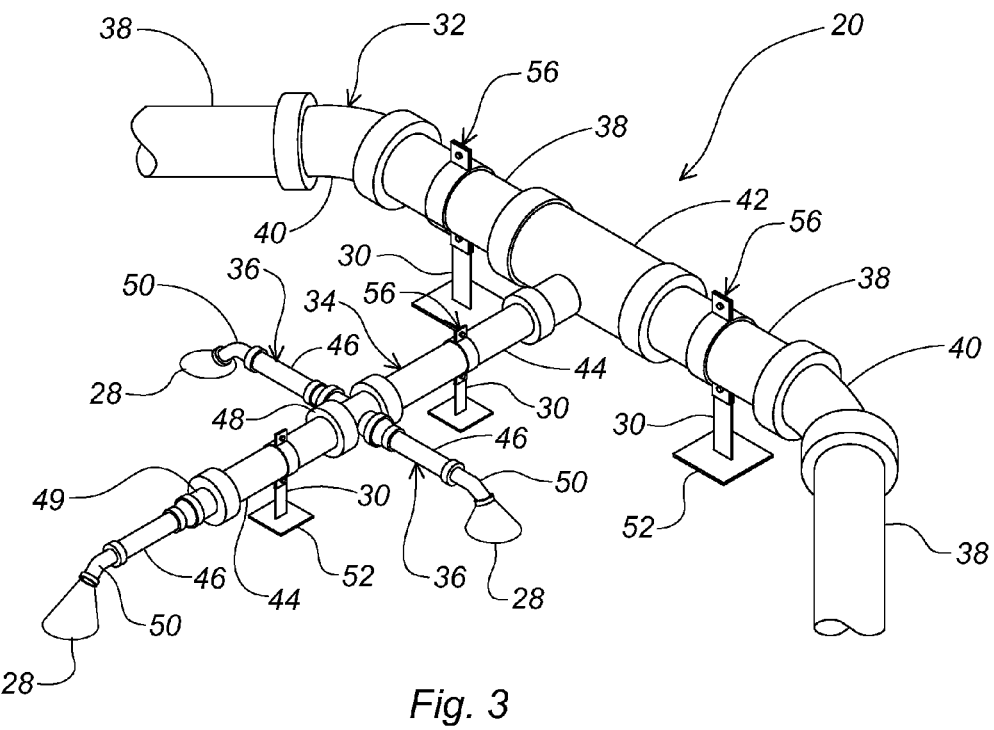
FIG. 3 is a partial perspective view of the manifold.

Turning to FIGS. 2 and 3, manifold 20 is positioned along a bottom wall of water tower 10 and is flowably connected to a plurality of downwardly directed nozzles 28 which may have a cowbell or trumpet shape or be otherwise flared. Manifold 20 is supported above the bottom wall on struts 30 such that nozzles 28 are positioned above the bottom wall in the vicinity of the sediment. The pressure head in water tower 10 causes sediment to be vacuumed out of the tank or tower by the nozzles when valve 24 allows water to flow through drain pipe 22.

As illustrated manifold 20 comprises a tubular conduit loop 32 connected to a plurality of radially inwardly extending conduits 34. Radially extending conduits 34 are flowably connected to laterally extending conduits 36 to which downwardly directed nozzles 28 are attached. The radially extending conduits 34 and laterally extending conduits 36 position nozzles 28 such that the sediment within tubular conduit loop 32 has a substantially equally short distance to a nozzle. Manifold 20 may be formed of PVC pipe segments connected with standard PVC pipe couplings. As shown in FIG. 2, to form tubular conduit loop 32, 4" PVC segments 38 are connected with a radius coupling 40 and joined to a tee coupling 42. Tee coupling 42 is connected to 2" radially extending segments 44 through a reducing coupling. In like manner, 1" PVC segments 46 are joined with a 4-way coupling 48 and with a reducing coupling 49 to radially extending conduit 34. At a free end of 1" PVC segments 46, an elbow coupling 50 positions nozzles 28 downwardly. While specific dimensions for the pipes in manifold 20 are given above, it will be understood that the size of the piping may depend on the size of the tank.

Figure 4:
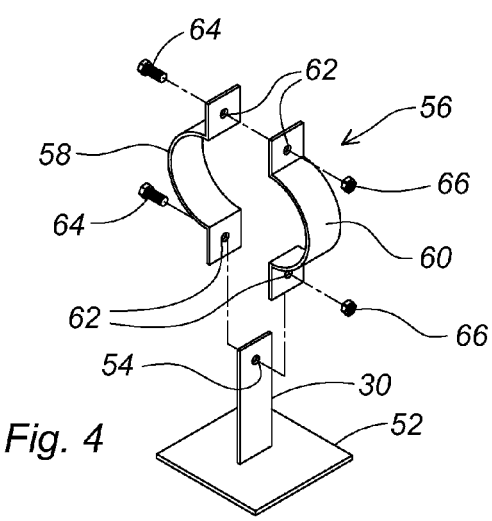
FIG. 4 is a perspective view of a strut for supporting the manifold above the floor of the bottom wall of the water tower and an associated flexible metal band for gripping sections thereof.

As shown in FIG. 4, struts 30 for positioning manifold 20 above the bottom wall of water tower 10 are mounted on metal plates 52 which may be welded or otherwise permanently attached to the bottom wall of water tower 10. Struts 30 have an aperture 54 at upper end for attachment to a flexible metal band 56 adapted to encircle and tightly clamp segments of tubular conduit loop 32 and segments of radially extending conduits 34. As illustrated in FIG. 4, each metal band 56 is formed of a pair of arcuate strips 58, 60, each strip having a curvature conforming generally to the curvature of the conduit segment to be mounted on strut 30. Each of strips 58, 60 has an upturned ends with openings 62 therein to accommodate a bolt 64. As illustrated, strips 58, 60 are joined to strut 30 with bolt 64 which passes through aperture 54 in strut 30 and openings 62 in the upturned ends of the strips and are secured thereto by a nut 66. Other end of strips 58, 60 is joined with another bolt 64 through openings 62 and secured with nut 66.

A network of other conduits 68 may extend radially outwardly from tubular conduit loop 32 as shown in FIG. 2 with laterally extending conduits 36 with suitable angle couplings to adapt manifold 20 to the curvature of the bottom wall of water tower 10 as needed. It will also be understood that tubular conduit loop 32, while shown as generally circular in the drawings, may take other shapes, e.g., oval, rectangular, etc. as needed to conform to the geometry of the particular water tower 10.

In use, system is installed in a clean elevated potable water tank or tower 10. Tubular conduit loop 32 is constructed of a size and shape adapted to fit in the bottom of the tank. Metal plates 52 are welded or otherwise attached to the bottom of the tank and tubular conduit loop 32 attached to struts 30 with flexible metal bands 56. Radially inwardly extending conduits 34 are similarly attached to struts 30 with flexible metal bands 56. Laterally extending conduits 36 bearing elbows 50 with downwardly extending nozzles 28 are positioned such that the area within tubular conduit loop 32 is effectively serviced by nozzles 28. If outwardly extending conduits 70 are provided they are attached to tubular conduit loop 32 and connected to struts 30 with flexible metal bands 56. Drain pipe 22 is connected to tubular conduit loop 32 and passed through the inside of riser pipe 18. At the base of tower 10, drain pipe 22 exits riser pipe 18.

When valve 24 is open, sediment is vacuumed up by nozzles 28 and is expelled through drain pipe 22. The operator in charge of discharging the sediment does not need to climb tower 10 or be specially trained, just authorized to open valve 24. If this is done on a periodic basis, even poorer or less populated communities or communities with stretched budgets can keep their tanks sediment free thus avoiding possible disastrous discharge of disease laden sediment into the water distribution system. Maintenance costs of the system are also kept low. If portions need maintenance, those sections needing replacement may be removed by unbolting metal bands 56 without removing plates 52 or other portions of the system.

In view of the above, it will be seen that the several objects of the invention are achieved and other advantageous results attained. As various changes could be made in the above constructions without departing from the scope of the invention, it is intended that all matter contained in the above description or shown in the accompanying drawings shall be interpreted as illustrative and not in a limiting sense.

What is claimed:

1. A gravity feed, elevated potable water tank or tower wherein an accumulation of sediment occurs along a bottom wall surface, said tank or tower having a riser pipe having an inside which serves as a water inlet and outlet, said tank or tower holding water at a pressure head, and a passive system for vacuuming out the sediment comprising a conduit manifold along a bottom wall of the tank or tower with conduit branches connected to a plurality of nozzles downwardly directed to the bottom wall surface, said manifold supported above the bottom wall on struts such that the nozzles are positioned above the bottom wall in the vicinity of the sediment, a drain pipe connected to the manifold and extending through the inside of the riser pipe, a valve for controlling flow of water through the drain pipe, said nozzles and manifold in fluid communication with the drain pipe, whereby the pressure head in the tank or tower causes sediment to be vacuumed out of the tank or tower by the nozzles as water flows down through the drain pipe.

2. The tank or tower of claim 1 wherein the conduit branches comprise plurality of radially inwardly extending conduits, said struts supporting the tubular conduit loop and the radially extending conduits, said radially extending conduits connected to a plurality of laterally extending conduits to which the downwardly directed nozzles are attached, said radially extending conduits and laterally extending conduits positioning the nozzles such that the sediment within the tubular conduit loop has a substantially equally short distance to a nozzle.

3. The tank or tower of claim 2 wherein each strut is mounted on a plate welded to the bottom wall of the tank.

4. The tank or tower of claim 3 wherein flexible metal bands adapted to encircle and tightly clamp the tubular conduit loop and radially extending conduits are provided at each associated strut, each strut having an aperture and each flexible metal band having upturned ends with openings, each flexible metal band attached to the associated strut with a bolt secured with a nut, said bolt passing through the aperture in the strut and openings in the flexible metal band.

5. The tank or tower of claim 2 wherein the nozzles are flared.

6. The tank or tower of claim 2 wherein the tubular conduit loop, radially extending conduits and laterally extending conduits have progressively smaller channels thereby to increase the speed of water flow through the nozzles.

7. A gravity feed, elevated potable water tank or tower wherein an accumulation of sediment occurs along a bottom wall surface, said tank or tower having
   a riser pipe having an inside which serves as a water inlet and outlet, said tank or tower holding water at a pressure head, and
      a passive system for vacuuming out the sediment comprising a manifold along the bottom wall of the tank or tower connected to a plurality of nozzles downwardly directed to the bottom wall surface, said manifold supported above the bottom wall on struts such that the nozzles are positioned above the bottom wall in the vicinity of the sediment, said manifold comprising a tubular conduit loop connected to a plurality of radially inwardly extending conduits, said struts supporting the tubular conduit loop and the radially extending conduits, said radially extending conduits connected to a plurality of laterally extending conduits to which the downwardly directed nozzles are attached, said radially extending conduits and laterally extending conduits positioning the nozzles such that the sediment within the tubular conduit loop has a substantially equally short distance to a nozzle, said tubular conduit loop, radially inwardly extending conduits and laterally extending conduits formed of PVC pipe segments and couplings with the tubular conduit loop having a larger channel than the radially inwardly extending conduits and the radially inwardly extending conduits having a larger channel than the laterally extending conduits, a drain pipe connected to the tubular conduit loop and extending through the inside of the riser pipe, a valve for controlling flow of water through the drain pipe, said nozzles, laterally extending conduits, radially inwardly extending conduits and tubular conduit loop in fluid communication with the drain pipe, whereby the pressure head in the tank or tower causes sediment to be vacuumed out of the tank or tower by the nozzles as water flows down through the drain pipe.

8. The tank or tower of claim 7 wherein the nozzles are flared.

9. The tank or tower of claim 7 further comprising a settling tank for receiving water laden with sediment exiting the drain pipe at a bottom of the water tank or tower.

10. The tank or tower of claim 7 wherein the tubular conduit loop has a 4 inch channel, the radially inwardly extending conduits have a 2 inch channel and the laterally extending conduits have a 1 inch channel.

* * * * *